(12) United States Patent
Pavan (10) Patent No.: US 7,471,751 B2
(45) Date of Patent: Dec. 30, 2008

(54) POWER AND AREA EFFICIENT ADAPTIVE EQUALIZATION

(75) Inventor: Shanthi Pavan, Madras (IN)

(73) Assignee: Vitesse Semiconductor Corporation, Camarillo, CA (US)

( * ) Notice: Subject to any disclaimer, the term of this patent is extended or adjusted under 35 U.S.C. 154(b) by 179 days.

(21) Appl. No.: 10/872,108

(22) Filed: Jun. 17, 2004

(65) Prior Publication Data

US 2005/0281364 A1 Dec. 22, 2005

(51) Int. Cl.
*H04B 1/10* (2006.01)
(52) U.S. Cl. ...................................... 375/350
(58) Field of Classification Search ................. 375/229, 375/232, 348, 349, 350; 331/117 R, 140, 331/137
See application file for complete search history.

(56) References Cited

U.S. PATENT DOCUMENTS

| | | | | |
|---|---|---|---|---|
| 5,734,680 | A * | 3/1998 | Moore et al. ................. | 375/263 |
| 5,995,561 | A * | 11/1999 | Yamasaki et al. ............ | 375/341 |
| 6,178,101 | B1 * | 1/2001 | Shires .......................... | 363/39 |
| 2002/0145481 | A1* | 10/2002 | Murgulescu ............ | 331/117 R |
| 2004/0150486 | A1* | 8/2004 | Barr et al. ...................... | 333/1 |
| 2004/0190661 | A1* | 9/2004 | Vrazel .......................... | 375/350 |
| 2005/0058385 | A1* | 3/2005 | Tanbakuchi .................... | 385/1 |

OTHER PUBLICATIONS

D.A. Johns et al., "Orthonormal Ladder Filters," IEEE Transactions on Circuits and Systems, vol. 36, No. 3, pp. 337-343 (Mar. 1989).
H. Wu et al., "Integrated Transversal Equalizers in High-Speed Fiber-Optic Systems," IEEE Journal of Solid-State Circuits, vol. 38, No. 12 (Dec. 2003).

* cited by examiner

*Primary Examiner*—Sam K Ahn
(74) *Attorney, Agent, or Firm*—Klein, O'Neill & Singh, LLP (57) ABSTRACT

Methods, apparatuses, and systems are presented for performing channel equalization comprising receiving a signal from a channel associated with inter-symbol interference, processing the received signal to effectively apply a plurality of linearly independent impulse responses to the received signal to produce a plurality of intermediate signals, scaling each of the intermediate signals by each of a plurality of multiplier factors to produce a plurality of scaled signals, and combining the scaled signals to produce a resulting signal corresponding to an equalized version of the received signal in order to reduce effects of inter-symbol interference. Processing of the received signal may comprise providing the received signal to an LCR network comprising a plurality of inductors and a plurality of capacitors and generating, as the intermediate signals, a plurality of inductor signals representing currents through the plurality of inductors and a plurality of capacitor signals representing voltages across the plurality of capacitors.

16 Claims, 9 Drawing Sheets

Fig. 1

PRIOR ART

Fig. 2

PRIOR ART

Fig. 3

PRIOR ART

POWER AND AREA EFFICIENT ADAPTIVE EQUALIZATION

CROSS-REFERENCES TO RELATED APPLICATIONS

This application is filed concurrently with related U.S. patent application Ser. No. 10/872,307, filed Jun. 17, 2004 by Shanthi Pavan for "Improved Integrated Circuit Implementation for Power and Area Efficient Adaptive Equalization" the entire disclosure of which is incorporated by reference in this application for all purposes.

BACKGROUND OF THE INVENTION

Traditional approaches for performing adaptive equalization on a signal received from a channel associated with inter-symbol interference (ISI) typically involve conventional filtering techniques such as analog-to-digital conversion followed by processing by a digital finite impulse response (FIR) filter, use of an analog traveling wave FIR filter, or use of a tapped delay line FIR filter. Digital FIR filters are associated with fundamental limitations that become greatly exacerbated in dealing with wide bandwidth signals found in high-speed channels. At the same time, known analog techniques typically suffer from cumbersome implementation.

Figure 1:
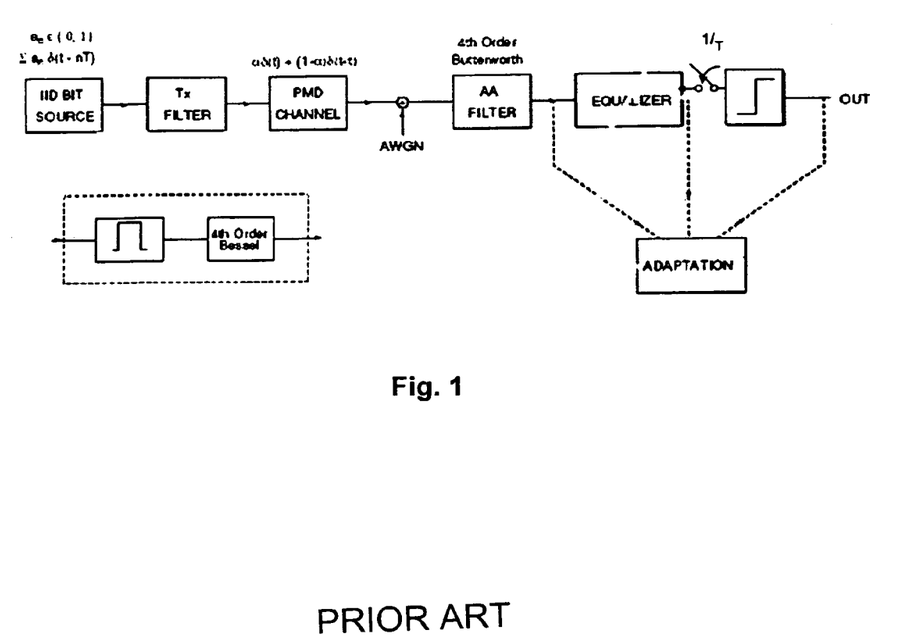
FIG. 1 is a system level block diagram of a communication link in which a signal containing data is transmitted and received over a channel associated with noise and ISI, and adaptive equalization is applied to the received signal in attempting to mitigate effects of ISI.

FIG. 1 is a system level block diagram of a communication link in which a signal containing data is transmitted and received over a channel associated with noise and ISI, and adaptive equalization is applied to the received signal in attempting to mitigate effects of ISI. As shown, the transmitter generates source data represented by a sequence of independent, identically distributed (i.i.d.) random impulse train $$s(t) = \sum_n a_n \delta(t - nT) \quad (1)$$

where $\alpha_n \in \{0,1\}$ and can take on either value with equal probability. While this particular impulse train is illustrated as an example, the invention is not necessarily limited to use in conjunction with i.i.d. signals. Similarly the use of a two-level signal is also presented here for purposes of illustration, and the invention needs not necessarily be limited to two-level signals. 1/T corresponds to the bit rate. Non-return to zero (NRZ) transmission is shown here, so that the random impulse train from the source is filtered by a filter with a rectangular impulse response of height unity & width T. As shown in the figure, a 4th order Bessel filter is presented to model the finite bandwidth of the transmitter. One 3 dB bandwidth for the transmit filter may be 0.7/T Hz. The channel may be a high-speed channel such as an optical fiber channel. The channel may also comprise another type of medium, such as copper wire. The channel may be associated with various forms of inter-symbol interference (ISI), such as Polarization Mode Dispersion (PMD), Chromatic Dispersion (CMD), Differential Mode Delay (DMD), and others. For example, for a channel impaired with PMD, the channel impulse response may be written as $$h(t) = \alpha\delta(t) + (1-\alpha)\delta(t-\tau) \quad (2)$$

where $0 \leq \alpha \leq 1$ is the power split parameter and $\tau$ is the differential group delay (DGD). Here, Additive White Gaussian Noise (AWGN) of two sided spectral density $N_o/2$ is shown to be introduced. There may be various ways in which noise is introduced. For example, in an optoelectronic transceiver, a photo receiver may add noise. In other communication channels, the receiver front end may be the dominant source of noise. Furthermore, other types of processing as well as the channel itself may also be sources of noise.

As shown in FIG. 1, the receiver includes a noise filter followed by an adaptive equalizer. Here, the noise filter is modeled by a 4th order Butterworth filter, and its impulse response is denoted by $h_{aa}(t)$. The receiver is shown to also include an equalizer block, a decision element, and an adaptation block, which may together represent a general structure for implementing adaptive equalization to mitigate effect of ISI.

While FIG. 1 illustrates a general structure for performing adaptive equalization, implementation of a particular adaptive equalization technique may be especially challenging. Traditional approaches for performing filtering operations for adaptive equalization are associated with substantial shortcomings, especially when implemented at high data rates. These traditional approaches include use of digital FIR filters as well as traveling wave FIR filters.

A fundamental problem associated with digital FIR filters relates to the wide bandwidth of signals from high-speed channels, which requires substantial amounts of signal processing to be performed at extremely high speeds. In this approach, the received signal is typically digitized by a high speed analog-to-digital converter (ADC) after noise filtering, and filtering is accomplished digitally such as by use of a digital signal processor (DSP). To obtain equalizer performance that is insensitive to the sampling phase of the ADC, the sampling frequency may be specified at double the baud rate, so that a fractionally spaced equalizer can be implemented. While this is straightforward at low data rates, it is an extremely difficult to accomplish at high speeds, in terms of both power dissipation and area efficiency. Thus, use of a DSP FIR filter for performing adaptive equalization on signals derived from high speed channels may be prohibitively costly and impracticable.

Figure 2:
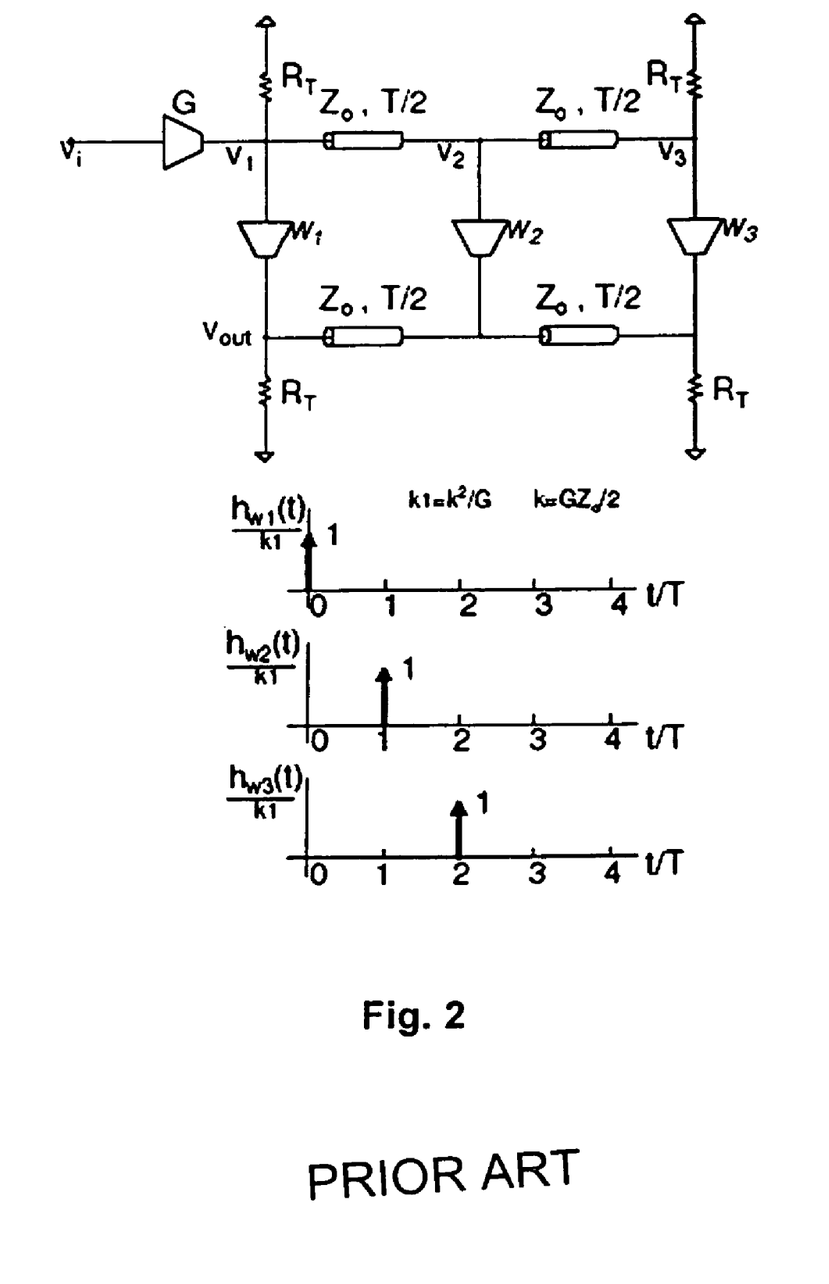
FIG. 2 illustrates a circuit diagram for a 3-tap example of a traveling wave FIR filter along with a corresponding impulse response plot.

A traveling wave FIR filter represents a continuous-time approach to adaptive equalization but presents significant limitations of its own. FIG. 2 illustrates a circuit diagram for a 3-tap example of a traveling wave FIR filter along with a corresponding impulse response plot. The traveling wave FIR filter is comparable to a traveling wave amplifier, but with the output being taken at the "anti-sync" end, as shown in FIG. 2. The filter has two sections of cascaded transmission lines, one on the input side and one on the output side. The illustrated impulse response of the filter may be written as $$h(t) = w_1 h_{w1}(t) + w_2 h_{w2}(t) + w_3 h_{w3}(t) \quad (3)$$

$h_{w1}(t)$ is the impulse response of the filter with w1=1 and w2, w3=0. $h_{w2}(t)$ and $h_{w3}(t)$ are similarly defined. These responses are shown in FIG. 2. In this example, it is assumed that the termination resistors are equal to the characteristic impedance of the transmission lines used for the input and output lines of the filter. Ideally, $$h_{w1}(t) = w_1 \delta(t) \quad (4)$$

$$h_{w2}(t) = w_2 \delta(t-2T) \quad (5)$$

$$h_{w3}(t) = w_3 \delta(t-2T) \quad (6)$$

High bandwidth transmission lines may be required for operation of a traveling wave FIR filter. This means that low loss transmission lines with bandwidths in excess of the data rates may be necessary. Because transmission lines are cascaded in order to achieve the desired delay, problems associated with finite bandwidth and loss are exacerbated when a large number of taps are required. Low loss transmission lines can be obtained through well known techniques such as patterned ground shield inductors. However, to reach bandwidths of the line that exceed the data rate, inductors may be required to be wound loosely, resulting in excessive area occupied by the filter. This problem is further aggravated by the requirement of providing transmission lines in both the input and output lines. Further, the adaptation of the filter coefficients for a traveling wave FIR filter also presents substantial difficulties. Hardware efficient coefficient adaptation using a least mean square (LMS) algorithm or other algorithms may require access to gradient signals that represent the derivative of the output signal with respect to the tap weights. In a traveling wave FIR filter, however, gradient signals are typically not available. Thus, use of traveling wave FIR filter may preclude the direct use of an LMS algorithm to adaptively determine the filter tap weights.

Figure 3:
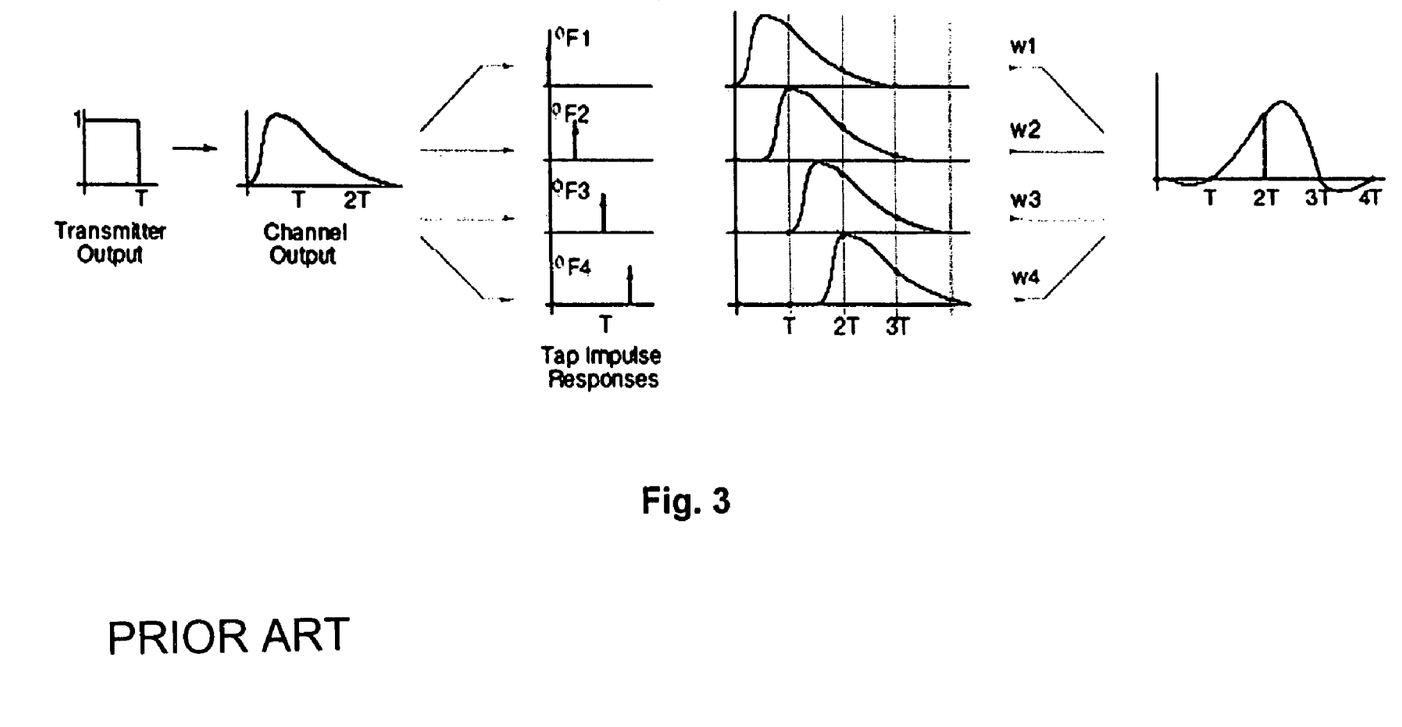
FIG. 3 illustrates equalization performed using a traditional FIR filter.

FIG. 3 illustrates equalization performed using a traditional FIR filter, such as a traveling wave FIR filter or a tapped delay line FIR filter as described above. As shown in the figure, a signal from the communication channel is equalized by a tapped delay line 4-tap (T/2) spaced FIR filter, followed by a sampler and decision device. The filter is driven by the channel output. If a single symbol is assumed to excite the channel input, the FIR filter input is a waveform which is the convolution of the transmit pulse shape (NRZ in this example) with the channel impulse response. Successive taps of the equalizer produce outputs which are convolved versions of the channel output and tap impulse responses. For the fractionally spaced equalizer being considered here, the tap outputs are delayed versions of the channel output, as shown in the figure. These taps outputs are combined with weighting factors $w_1$, $w_2$, $w_3$, and $w_4$, which may be determined prior to the filtering process to minimize ISI at the output of the equalizer.

Here, the equalizer output is decomposed as the weighted sum of four filtered versions of the input signal. These four filtered signals are time limited to 5T in this example. The impulse responses corresponding to the taps are four time limited orthogonal pulses $\{\phi F1, \phi F2, \phi F3, \phi F4\}$. As shown, these are Dirac delta functions with infinite bandwidth, at least in theory. The decision process may be based on the output of a sampler (not shown) sampling the final signal in FIG. 3. It can be seen that the tap impulse responses contain very high frequency components. An implementation of the equalizer illustrated in FIG. 3 would thus require the use of wideband delay elements, which may be associated with greater power and area consumption. For example, this may place geometric constraints on the transmission lines previously described with respect to traveling wave filters.

Accordingly, there exists a significant need for performing filtering operations for adaptive equalization in a power and area efficient manner, especially for equalization of signals associated with high speed channels.

BRIEF SUMMARY OF THE INVENTION

The present invention relates to methods, apparatuses, and systems for performing channel equalization comprising receiving a signal from a channel associated with inter-symbol interference, processing the received signal to effectively apply a plurality of linearly independent impulse responses to the received signal to produce a plurality of intermediate signals, scaling each of the intermediate signals by each of a plurality of multiplier factors to produce a plurality of scaled signals, and combining the scaled signals to produce a resulting signal corresponding to an equalized version of the received signal in order to reduce effects of inter-symbol interference.

According to one embodiment of the invention, processing of the received signal may comprise providing the received signal to an LCR network comprising a plurality of inductors and a plurality of capacitors and generating, as the intermediate signals, a plurality of inductor signals representing currents through the plurality of inductors and a plurality of capacitor signals representing voltages across the plurality of capacitors. The LCR network may comprise a plurality of inductors connected in series to form an inductor chain and a plurality of capacitors each connected between a position along the inductor chain and a common position. In one embodiment, the LCR network is singly terminated by a resistor connected to one end of the inductor chain. In another embodiment, the LCR network is doubly terminated by a resistor connected to one end of the inductor chain and another resistor connected to another end of the inductor chain.

Further, the multiplier factors may be dynamically adjusted to reduce an error measure based on the resulting signal. The multiplier factors may be dynamically adjusted according to a least mean square (LMS) algorithm. The LMS algorithm may utilize the intermediate signals as gradient signals in dynamically adjusting the multiplier factors. Inter-symbol interference may be associated with polarization mode dispersion (PMD), and the equalized signal may thus have reduced effects relating to PMD.

DETAILED DESCRIPTION OF THE INVENTION

Continuous Time Equalizer (CTE)

Figure 4:
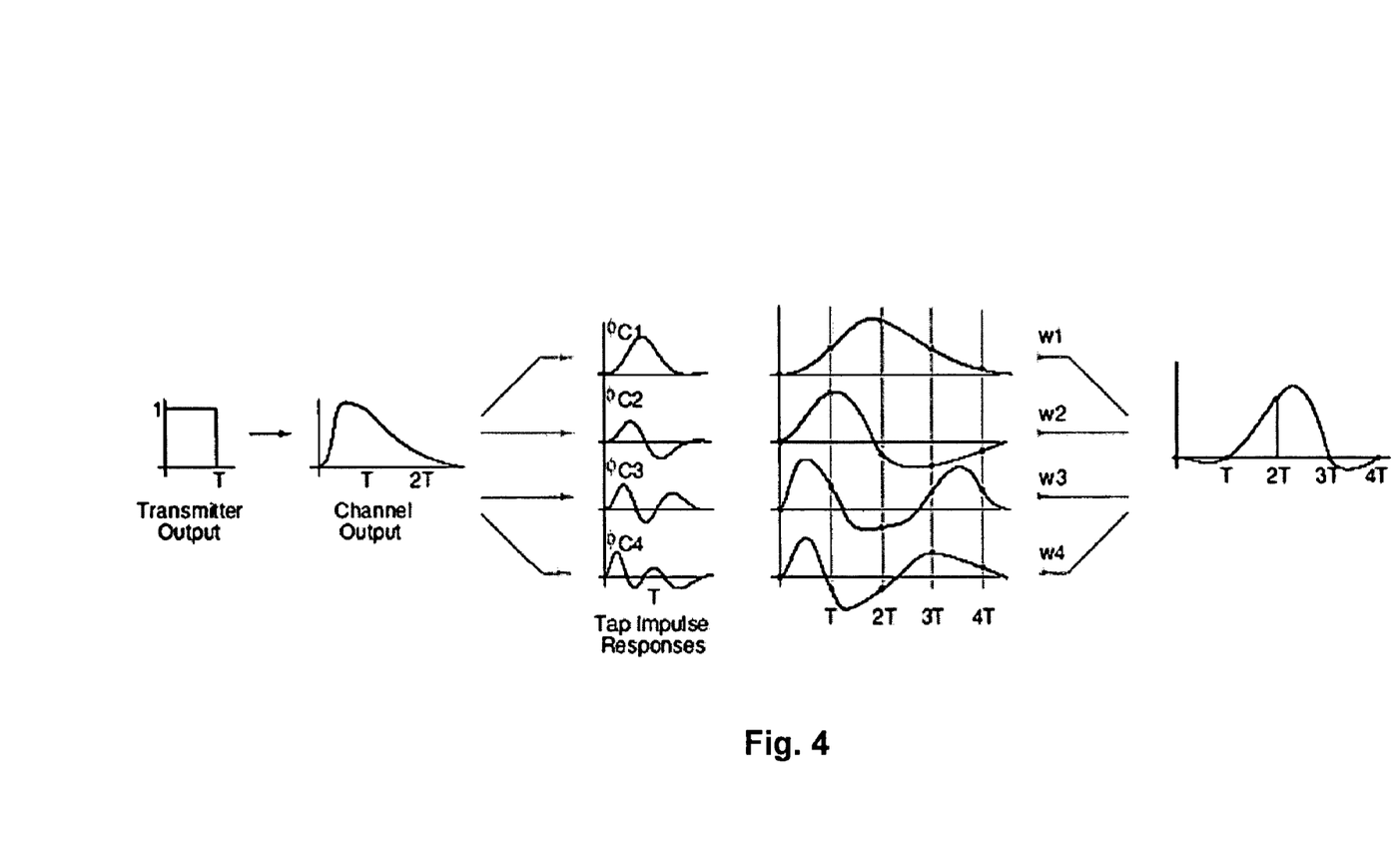
FIG. 4 illustrates equalization performed using a filtering arrangement referred to here as a continuous time equalizer (CTE), in accordance with an embodiment of the present invention.

FIG. 4 illustrates equalization performed using a filtering arrangement referred to here as a continuous time equalizer (CTE), in accordance with an embodiment of the present invention. As shown, the CTE uses a set of approximately time and frequency limited basis impulse responses {ϕC1, ϕC2, ϕC3, ϕC4}. These impulse responses are not as broadband as the Dirac delta function impulse responses shown in FIG. 3 and may span multiple bit periods. As such, it is possible to realize impulse responses {ϕC1, ϕC2, ϕC3, ϕC4} using low bandwidth components, such as low bandwidth analog circuits. These impulse responses may be continuous-time basis functions that form a linearly independent set, such that a suitable linear combination of the basis impulse responses should be equivalent, after the sampler (not shown), to a 4-tap FIR filter with arbitrary weights. As further described in later sections, it is possible to compute a vector of weights such that ISI is minimized at the equalizer output, shown as the last signal in this figure.

Figure 5:
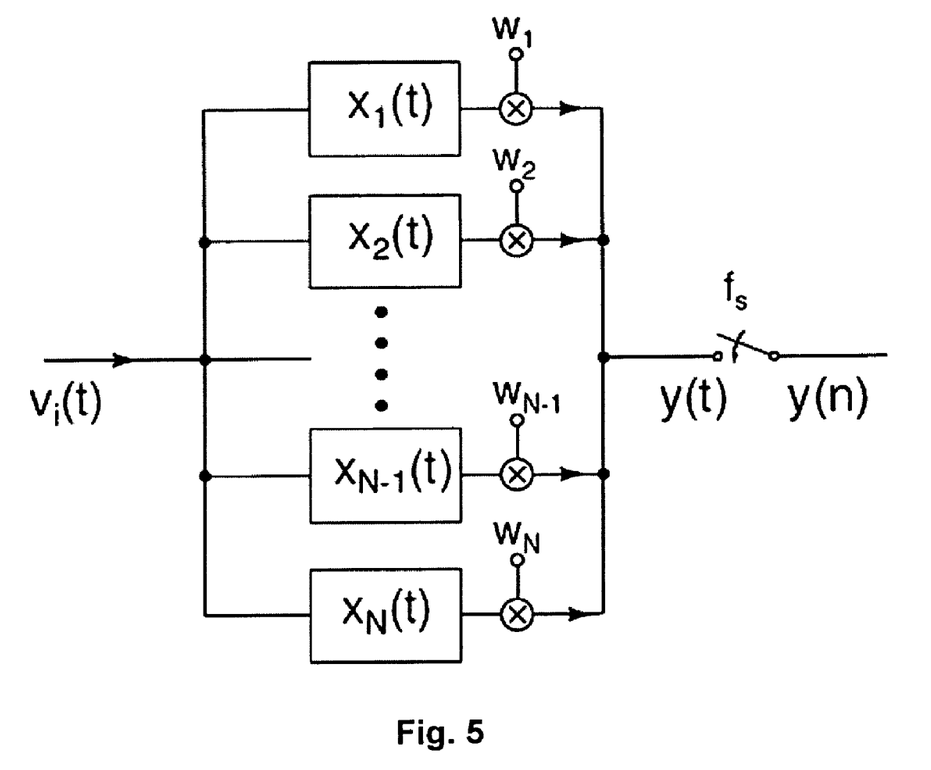
FIG. 5 is a representation of the CTE filtering arrangement shown in FIG. 4.

FIG. 5 is a representation of the CTE filtering arrangement shown in FIG. 4. Because the basis functions illustrated in FIG. 4 extend over several bit intervals, they can be associated with a bank of low bandwidth continuous-time filters. Thus, an equivalent FIR filter can be built using a linear combination of such low bandwidth continuous-time filters. This approach can be extended to a realize an FIR filter with an arbitrary number of taps. In one embodiment of the invention, the impulse responses are linearly independent impulse responses. In another embodiment of the invention, the impulse responses are linearly independent and orthogonal impulse responses. While it may only be desired that the sampled impulse responses be linearly independent, a linear combiner involving these responses may converge more quickly if these responses were orthogonal. For notational simplicity, the {ϕCi(t)} in FIG. 5 may be referred to as $x_1(t), \ldots, x_N(t)$.

In accordance with the present embodiment of the invention, illustrative design steps associated with realizing an N-tap FIR filter using a CTE are outlined below:
  a. Find a suitable set $\{x_i(t)\}$ of N continuous-time impulse responses which are approximately time limited to NT, where T is the symbol spacing.
  b. Determine the weights to be applied to the basis functions to satisfy some optimality condition as required by the system shown in FIG. 1.
  c. Find circuit topologies for the realization of the above basis impulse responses in an efficient manner.
  d. Examine how the coefficients may be adaptively adjusted to satisfy a desired criterion.

Minimum Mean Square Error (MMSE) Solution for a Continuous Time Equalizer

Figure 6:
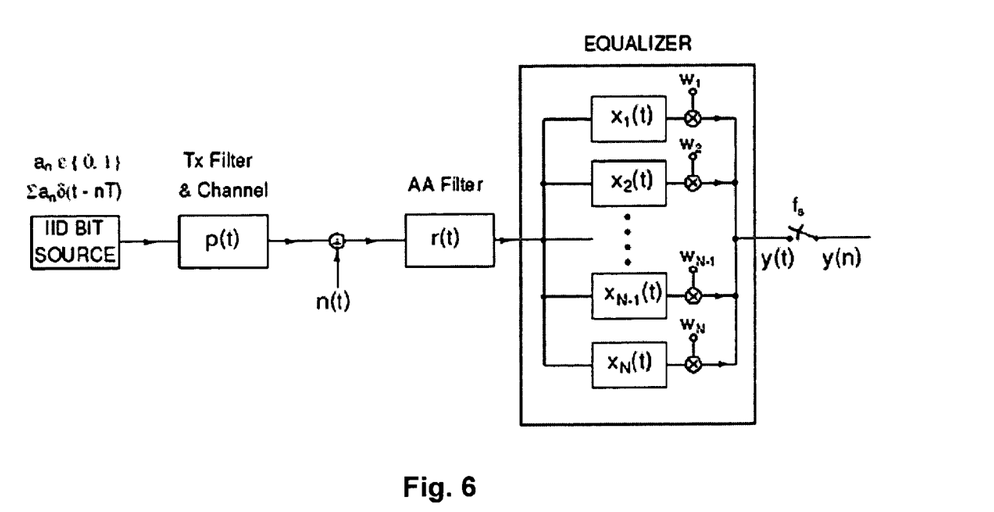
FIG. 6 is a block diagram of a CTE implemented within a communication system in accordance with one embodiment of the present invention.

Next, a minimum mean square error (MMSE) solution is derived for a CTE. The equalizer is assumed to consist of a bank of N filters, with impulse responses $x_1(t), \ldots, x_N(t)$. As discussed in detail below, values of the CTE taps that will minimize the mean squared error at the equalizer output may be found. FIG. 6 is a block diagram of a CTE implemented within a communication system in accordance with one embodiment of the present invention. Various parameters shown in FIG. 6 are described below:

a(n) represents the transmitted data.

p(t) represents the complete channel response prior to the receiver—it is associated with the cascade of the pulse shape (NRZ), the transmit filter and the PMD channel.

n(t) represents the receiver input noise, considered white and having a double sided spectral density of $N_o/2$.

r(t) represents the impulse response of the receiver noise filter.

$x_i(t) \ldots$ represent the impulse responses of the bank of analog filters. Here, the equalizer is assumed to consist of a bank of N such responses.

y(t) represents the output of the equalizer.

y(n) represents the $n^{th}$ output sample.

Here, the output of the equalizer may be expressed as:

$$y(t) = \sum_{i=1}^{N} \sum_{k=-\infty}^{\infty} w_i \, a(k) \, c_i(t - kT) + \sum_{i=1}^{N} w_i \, n(t) * f_i(t) \quad (10)$$

where the $c_i(t)=p(t)*r(t)*x_i(t)$ and $f_i(t)=r(t)*x_i(t)$, with the symbol * representing the convolution operation. Accordingly, $$y(n) = \sum_{i=1}^{N} \sum_{k=-\infty}^{n} w_i \, a(k) \, c_i(nT - kT) + \sum_{i=1}^{N} w_i \, n(t) * f_i(t))\Big|_{t=nT} \quad (11)$$

The above equation can be recast in matrix form as follows—the samples of $c_i(t)$ are represented such that $C_{ij}=c_j(iT)$. Assuming that $c_i(t)$ is negligible for t>LT, we see that the size of C is N×(L+1). Further, let $a^T(n)=[a(n)a(n-1) \ldots a(n-L)]$ and $\eta^T(n)=[(n(t)*f_1(t))|_{t=nT}(n(t)*f_2(t))|_{t=nT} \ldots (n(t)*f_N(t))|_{t=nT}]$. Thus, $$y(n) = \quad (12)$$

$$a^T(n) \begin{bmatrix} c_1(0 \cdot T) & c_2(0 \cdot T) & \ldots & c_N(0 \cdot T) \\ c_1(0 \cdot T) & c_2(T) & \ldots & c_N(T) \\ \vdots & \vdots & \ddots & \vdots \\ c_1(L \cdot T) & c_2(L \cdot T) & \ldots & c_N(L \cdot T) \end{bmatrix} \begin{bmatrix} w_1 \\ w_2 \\ \vdots \\ w_N \end{bmatrix} + \eta^T(n) \begin{bmatrix} w_1 \\ w_2 \\ \vdots \\ w_N \end{bmatrix}$$

or, $$y(n) = a^T(n) \, Cw + \eta^T(n) w$$

It may be assumed that $h_\delta^T=[0 \; 0 \; \ldots \; 1 \; 0 \; \ldots \; 0]$. $h_\delta^T$ is a 1×(L+1) vector. The desired equalizer output is $a(n-\delta)=a^T(n) h_\delta$—Ideally, the transmitted sequence is obtained. However, a system delay of δ symbols may be acceptable here. The error at the output of the equalizer is:

$$e(n) = y(n) - a^T(n) h_\delta$$

$$= a^T(n)(Cw - h_\delta) + \eta^T(n) w$$

$$E[|e(n)|^2] = (Cw - h_\delta)^T E[a(n)^T a(n)](CW - h_\delta) + w^T E[\eta^T(n)\eta(n)]w$$

Since the transmitted sequence is independent and identically distributed (i.i.d.), $E[a(n)^T a(n)]=\sigma_a^2 I$ where $\sigma_a^2=E[|a(n)|^2]$. Now consider $E[\eta^T(n)\eta(n)]$. It is given by:

$$M = \frac{N_o}{2} \begin{bmatrix} \int_0^\infty f_1(t)f_1(t)dt & \int_0^\infty f_1(t)f_2(t)dt & \ldots & \int_0^\infty f_1(t)f_N(t)dt \\ \int_0^\infty f_2(t)f_1(t)dt & \int_0^\infty f_2(t)f_2(t)dt & \ldots & \int_0^\infty f_2(t)f_N(t)dt \\ \vdots & \vdots & \ddots & \vdots \\ \int_0^\infty f_N(t)f_1(t)dt & \int_0^\infty f_N(t)f_2(t)dt & \ldots & \int_0^\infty f_N(t)f_N(t)dt \end{bmatrix} \quad (13)$$

so that $$E[|e(n)|^2] = \sigma_a^2 (Cw - h_\delta)^T (Cw - h_\delta) + w^T M w \quad (14)$$

The aim here is to find w which minimizes the expected squared error at the output of the equalizer. Introducing $$\lambda = \frac{1}{\sigma_a^2},$$

the source power normalized mean squared error cost function $J_{MSE}$ may be obtained as:

$$J_{MSE} = (Cw - h_\delta)^T (Cw - h_\delta) + \lambda w^T M w$$

In terms of $A = C^T C + \lambda M$, the technique of "completing the squares" yields $$J_{MSE} = (w - A^{-1}C^T h_\delta)^T A (w - A^{-1}C^T h_\delta) - h_\delta^T C A^{-1} C^T h_\delta + h_\delta^T h_\delta \quad (15)$$

The above equation indicates that the weight vector resulting in the minimum mean square error is $$w_{opt} = A^{-1} C^T h_\delta \quad (16)$$

and the minimum normalized mean square error (which is a function of $\delta$) is $$J_{MSE,min} = h_\delta^T (I - C A^{-1} C^T) h_\delta \quad (17)$$

The optimal delay corresponds to the minimum diagonal element of $I - CA^{-1}C^T$. Therefore, $$\delta_{opt} = \arg\min\{[I - C(C^T C + \lambda M)^{-1} C^T]\} \quad (18)$$

Accordingly, a general topology for an adaptive filter based on a bank of continuous time filters is presented. Given a bank of N filters with impulse responses $x_1(t) \ldots x_N(t)$, a set of weights (equation (16)) can be found that would minimize the mean square error at the output of the decision device. According to an embodiment of the invention, a procedure for finding the equalizer performance is summarized below:
 a. Use equation (18) to find the optimal number of symbol delays that the received waveform needs to be equalized to. This step yields $h_\delta$.
 b. Use equation (16) to compute the optimum tap weight vector.
 c. Use equation (17) to compute the minimum normalized mean square error.

Orthogonal Filter Bank Design

Figure 7:
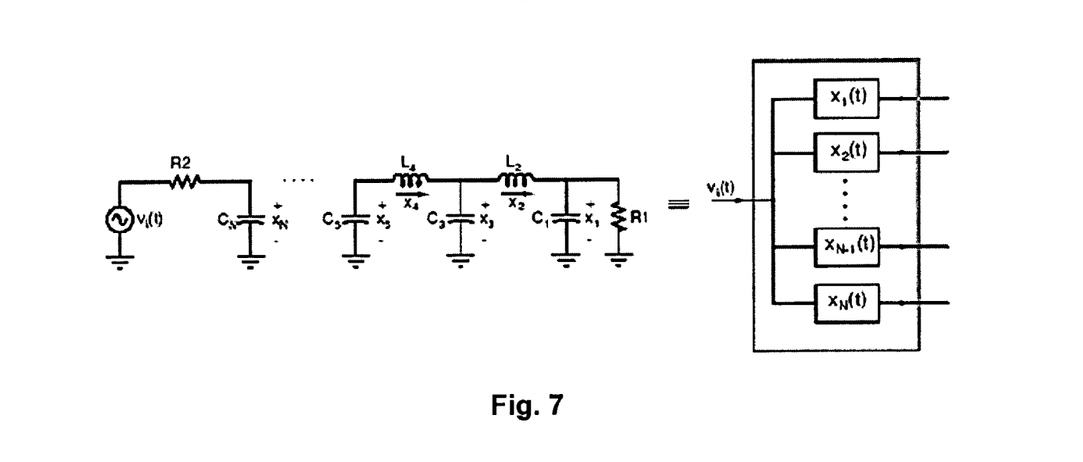
FIG. 7 is a circuit diagram of a doubly terminated ladder network for implementing a bank of filters corresponding to a continuous time equalizer in accordance with one embodiment of the present invention.

FIG. 7 is a circuit diagram of a doubly terminated ladder network for implementing a bank of filters corresponding to a continuous time equalizer in accordance with one embodiment of the present invention. Here, the N filters forming the filter bank of FIG. 6 are implemented as parts of a single network. This arrangement allows the network to be driven by one signal to effectively operate all N filters. This arrangement avoids loading problem that may be associated with simultaneously driving the inputs of N filters such as those illustrated in FIG. 6, which could degrade signal bandwidth at the point of loading. The single network shown in FIG. 7 could easily be driven by an amplifier at the output of the noise filter.

As shown in FIG. 7, the network presented is an $N^{th}$ order LC ladder. The state variables of this network are the capacitor voltages and inductor currents. Here, the LC ladder is an LCR network having a plurality of inductors connected in series for form an inductor chain and a plurality of capacitors each connected between a position along the inductor chain and a common position shown as "ground" in this figure. Components in the network such as inductors, capacitors, resistors, or others, may be implemented as passive elements or active elements. For example, such active elements may be constructed using transistors. Each state can be treated as an output of the network. The impulse responses of the state variables may be linearly independent functions and may be referred to as $x_1(t), \ldots x_N(t)$. Accordingly, an $N^{th}$ order ladder network represents a bank of filters whose impulse responses form a linearly independent set in the continuous-time domain.

A useful result for a state space system is illustrated below. The dynamics of an $N^{th}$ order network with a single input is represented by the set of state space equations:

$$\frac{dx}{dt} = Ax + bv_i(t) \quad (19)$$

where $x^T = [x_1(t) x_2(t) \ldots x_N(t)]$ is the vector of state variables. The impulse response vector is give by:

$$x(t) = e^{At} b, \; t > 0 \quad (20)$$

Let K be the correlation matrix between the various impulse responses. That is, $$K_{ij} = \int_0^\infty x_i(t) x_j^*(t) dt \quad (21)$$

$$K = \int_0^\infty e^{At} bb^T e^{A^T t} dt \quad (22)$$

To solve for K, consider the derivative of the integrand in equation (22) above.

$$\frac{d}{dt}(e^{At} bb^T e^{A^T t}) = A e^{At} bb^T e^{A^T t} + e^{At} bb^T e^{A^T t} A^T \quad (23)$$

Integrating both sides from 0 to $\infty$, $$\int_0^\infty \frac{d}{dt}(e^{At} bb^T e^{A^T t}) dt = \quad (24)$$
$$A \int_0^\infty e^{At} bb^T e^{A^T t} dt + \int_0^\infty e^{At} bb^T e^{A^T t} dt A^T$$

Using (22), the following result may be obtained:

$$-bb^T = AK + KA^T \quad (25)$$

or $$AK + KA^T + bb^T = 0 \quad (26)$$

Figure 8:
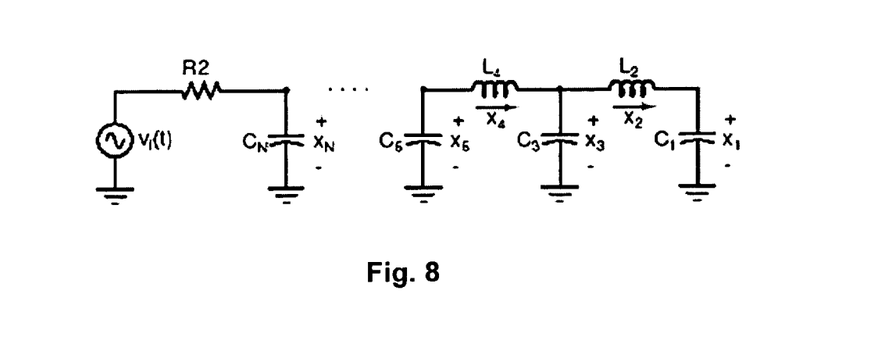
FIG. 8 is a circuit diagram of a singly terminated ladder network for implementing a bank of filters corresponding to a continuous time equalizer in accordance with one embodiment of the present invention.

FIG. 8 is a circuit diagram of a singly terminated ladder network for implementing a bank of filters corresponding to a continuous time equalizer in accordance with one embodiment of the present invention. The state equations for this ladder are:

$$\frac{dx(t)}{dt} = \begin{bmatrix} 0 & \frac{1}{C_1} & 0 & 0 & \ldots & 0 \\ -\frac{1}{L_2} & 0 & \frac{1}{L_2} & 0 & \ldots & 0 \\ 0 & -\frac{1}{C_3} & 0 & \frac{1}{C_3} & 0 & \ldots \\ \vdots & \vdots & \ldots & \ldots & \ldots & \vdots \\ 0 & \ldots & 0 & -\frac{1}{L_{N-1}} & 0 & \frac{1}{L_{N-1}} \\ 0 & \ldots & 0 & 0 & -\frac{1}{C_N} & -\frac{1}{C_N} \end{bmatrix} x(t) +$$

$$\begin{bmatrix} 0 \\ 0 \\ \vdots \\ \vdots \\ 0 \\ \frac{1}{C_N} \end{bmatrix} v_i(t)$$

In the following section, $x_i'(t) = \alpha_i x_i(t)$ for $i=1 \ldots N$. Scaling a state variable by 1 means that the every row of A and every row of b will be divided by $\alpha$ and every column of A will be multiplied by $\alpha$. Choose $$a_i = \frac{1}{C_i} \text{ or } \frac{1}{L_i}$$

as the case may be. Then, for a system with these scaled state variables, $$A' = \begin{bmatrix} 0 & \frac{1}{\sqrt{L_2 C_1}} & 0 & 0 & \ldots & 0 \\ -\frac{1}{\sqrt{L_2 C_1}} & 0 & \frac{1}{\sqrt{L_2 C_3}} & 0 & \ldots & 0 \\ 0 & -\frac{1}{\sqrt{L_2 C_3}} & 0 & \frac{1}{\sqrt{L_4 C_3}} & 0 & \ldots \\ \vdots & \vdots & \ldots & \ldots & \ldots & \vdots \\ 0 & \ldots & 0 & -\frac{1}{\sqrt{L_{N-1} C_{N-1}}} & 0 & \frac{1}{\sqrt{L_{N-1} C_N}} \\ 0 & \ldots & 0 & 0 & -\frac{1}{L_{N-1} C_N} & -\frac{1}{C_N} \end{bmatrix},$$

$$b' = \begin{bmatrix} 0 \\ 0 \\ \vdots \\ \vdots \\ 0 \\ \frac{1}{C_N} \end{bmatrix}$$

For the new set of scaled state variables, A' and b' satisfy (26) if we choose K=I. Therefore, $$K_{ij} = \int_0^\infty x_i'(t) x_j'^*(t) dt = \begin{cases} 1 & \forall\, i = j \\ 0 & \forall\, i \neq j \end{cases}$$

That is, the scaled state variables form an orthonormal set of functions. Since the original state variables are just scaled versions of the new state variables, it follows that they are orthogonal in the continuous time domain. Thus, a singly terminated ladder network such as that shown in FIG. 8 may be associated with state variables that form a bank of N orthogonal filters.

Equalizer Design Using a Singly-terminated Ladder

For a bank of N filters with impulse responses $x_1(t) \ldots x_N(t)$, a set of weights (equation (16)) can be found that would minimize the mean square error at the output of the decision device. A ladder network may form the basis of an efficient design of a bank of N filters that is suitable for use as an adaptive equalizer. Furthermore, the state variables of a singly terminated ladder form a bank of N orthogonal filters. Finally, if the filters are orthogonal, M of equation (13) reduces to a diagonal matrix if the noise filter has an infinite bandwidth.

Based on the above, an appropriate choice of $x_1(t) \ldots x_N(t)$ may be determined. Since they are state-variables of the same network, these transfer functions will all have the same denominator polynomial with differing numerators. That is:

$$X_i(s) = \frac{N_i(s)}{D(s)}, i = 1 \ldots N \tag{29}$$

D(s) is chosen to have maximally linear phase (or maximally flat group delay). This may correspond to the Bessel-Thomson filter approximation. It can be shown that the impulse response corresponding to $$\frac{1}{D(s)}$$

tends to a Gaussian pulse, for large N. Thus, the tails of the impulse response approach zero relatively quickly. These relationships may also be characterized in the following way:

a. Of all pulses with a given bandwidth, the Gaussian may have the least time width.
b. A high order Bessel filter has an impulse response that is a good approximation to the Gaussian.
c. A singly terminated ladder has impulse responses that are linear combinations of derivatives of an approximately Gaussian pulse.
d. Since the Gaussian dies down relatively quickly, all the impulse responses of a Gaussian ladder may be expected to die down quickly as well.

Figure 9:
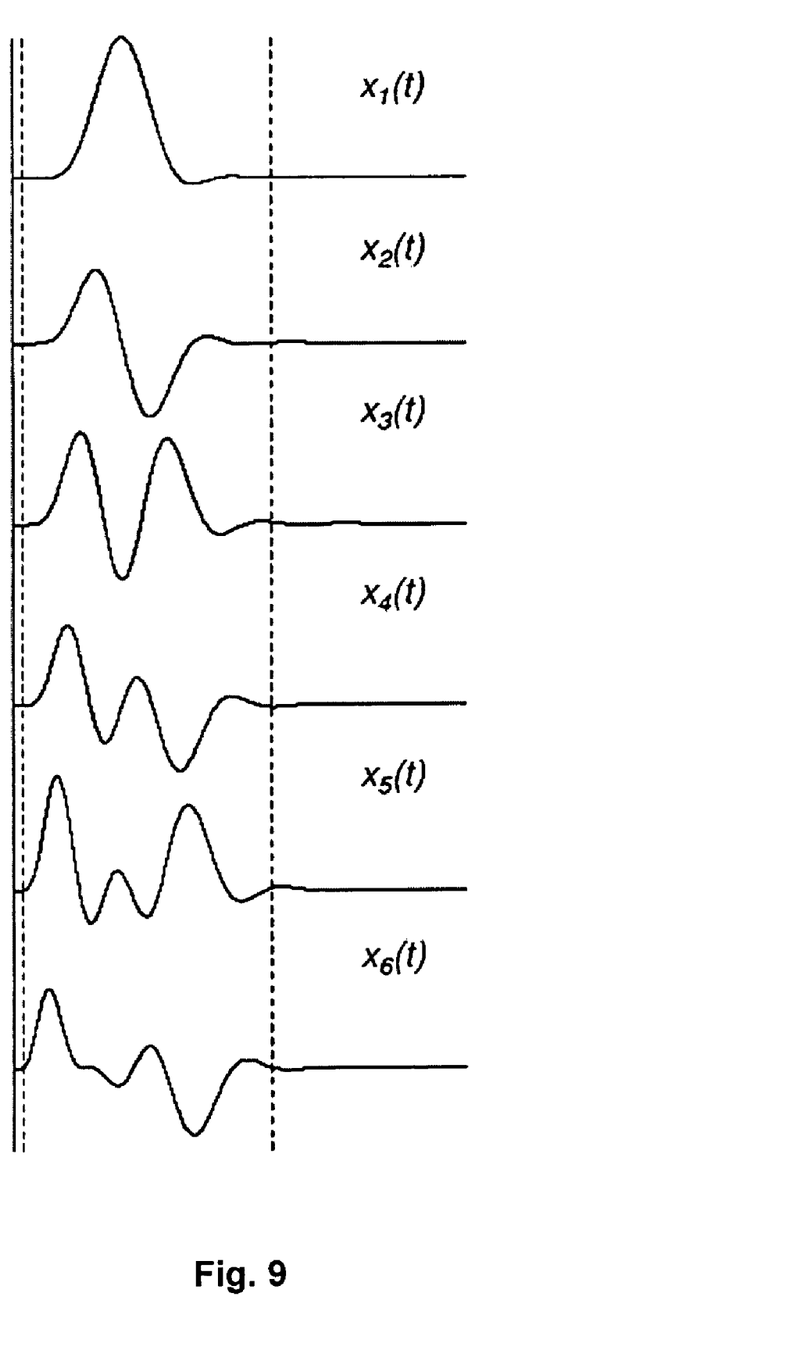
FIG. 9 is a plot of the first six impulse responses of a seventh order singly terminated Bessel ladder filter.

The CTE may be utilized in place of an N-tap FIR equalizer, which allows the filter impulse response to be manipulated over a time span of NT. Thus, the impulse responses of the CTE may have to be non-zero in the time 0<t<NT and zero after NT. This is taken into account in determining the bandwidth of the Bessel ladder. FIG. 9 is a plot of the first six impulse responses of a seventh order singly terminated Bessel ladder filter. As shown in the figure, the impulse responses are approximately time limited to the duration between the dotted lines.

Adaptive Tap Weight Estimation

Figure 10:
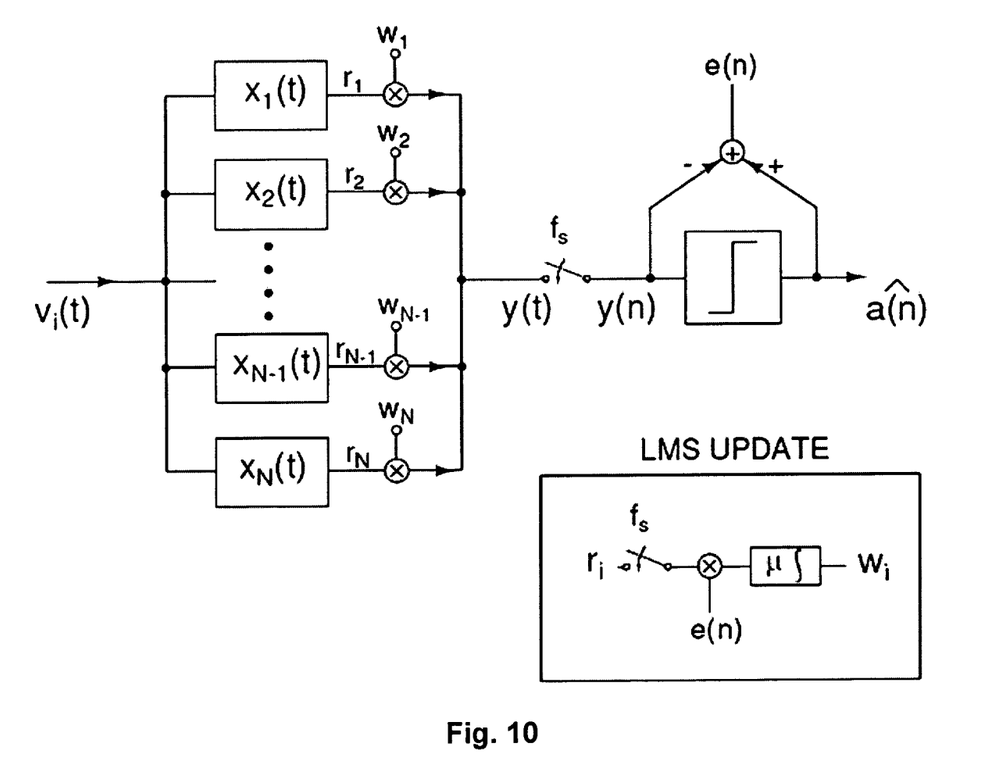
FIG. 10 is a block diagram of a CTE having tab weight that are updated by a decision directed LMS algorithm in accordance with an embodiment of the present invention.

FIG. 10 is a block diagram of a CTE having tab weights that are updated by a decision directed LMS algorithm in accordance with an embodiment of the present invention. The CTE discussed above may be seen as a linear combiner, which has a unimodal error surface. Hence, an LMS algorithm can be used to drive the tap weight vector in order to achieve a minimum mean square error (MMSE) solution. If the "eye" of the filtered signal is initially open, then a decision directed adaptation mode can be used. Here, $\mu$ represents a learning rate parameter which controls the speed of convergence of this adaptive equalization system. As shown in FIG. 10, the "gradients" used by the LMS algorithm are simply the outputs of the individual orthogonal filters, which are explicitly available. This makes the implementation of the LMS algorithm extremely simple, in contrast to a traveling wave FIR structure. Variants of the LMS algorithm, such as sign-sign and sign-gradient approaches, as well as other algorithms that minimize means squared error (MSE), such as a constant modulus algorithm (CMA), may be applied using the CTE discussed above, in various embodiments of the invention.

Simulation Results

Simulation results are presented below for a continuous-time equalizer (CTE) designed for a PMD channel. The following parameters are chosen in the simulations performed:

a. NRZ transmission at 10 Gbps is utilized.
b. The transmit filter is a fourth order Bessel filter with a bandwidth of 5 GHz.
c. The channel is modeled as $\alpha\delta(t)+(1-\alpha)\delta(t-\tau)$. $\alpha$ is called the power split and $\tau$ is referred to as the differential group delay (DGD).
d. n(t) is a white noise process. In the context of these simulations, noise power (or variance) refers to a 160 GHz bandwidth. For example, if $\sigma_N=0.25$, the standard deviation of noise in a 10 GHz bandwidth is $$\sqrt{\frac{10}{160}}.$$

e. The receive noise filter is a fourth order Butterworth filter with a bandwidth of 7 GHz.
f. The continuous-time equalizer is a six-filter orthogonal bank using 6 state variables of a seventh order singly terminated Bessel filter whose nominal 3 dB bandwidth is 3.0 GHz.

Figure 11:
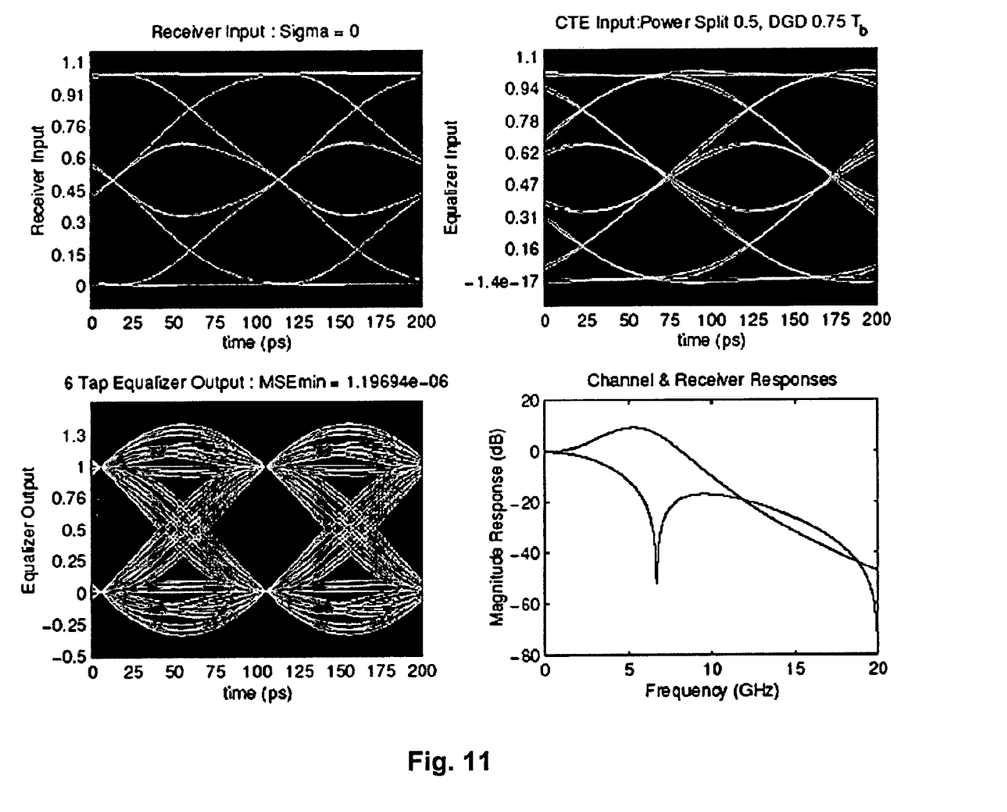
FIG. 11 presents various plots of the signals simulated to demonstrate functionality of the equalizer, with no noise added.

FIG. 11 presents various plots of the signals simulated to demonstrate functionality of the equalizer, with no noise added. A PMD channel characterized as $0.5\delta(t)+0.5\delta(t-0.75T_b)$ is utilized. The plots include the receiver input, the CTE input, the equalizer output, and responses of the channel and receiver. As shown in the equalizer output plot corresponding to the eye diagram, there seem to be very little residual ISI remaining after equalization. The "notched" curve shown in the last plot of FIG. 11 is the channel response, and the other curve is the receiver response.

Conclusion

A new technique for high speed adaptive equalization referred to here as a continuous time equalizer (CTE) is presented in various embodiments of the present invention. A CTE may be used as the feedback filter around a decision device, to result in efficient DFE architectures. A CTE implemented may allow for extremely compact circuit realization, simple LMS algorithm implementation that takes advantage of explicitly available gradient measures, and insensitivity to timing phase of the receive sampler which enables an easier timing recovery loop.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for performing channel equalization comprising:

receiving a signal from a channel associated with intersymbol interference;
processing the received signal to effectively apply a plurality of linearly independent impulse responses to the received signal to produce a plurality of intermediate signals, the processing comprising providing the received signal to an inductor, capacitor, resistance (LCR) network representing a Bessel filter having a bandwidth within an order of magnitude as a data transmission rate associated with the received signal, the LCR network comprising a plurality of inductors connected in series to form an inductor chain and a plurality of capacitors each connected between a position along the inductor chain and a common position, and generating, as the intermediate signals, a plurality of inductor signals representing currents through the plurality of inductors and a plurality of capacitor signals representing voltages across the plurality of capacitors;
scaling each of the plurality of intermediate signals by each of a plurality of multiplier factors to produce a plurality of scaled signals; and combining the plurality of scaled signals to produce a resulting signal corresponding to an equalized version of the received signal in order to reduce effects of the inter-symbol interference.

2. The method of claim 1 wherein the LCR network is singly terminated by a resistor connected to one end of the inductor chain.

3. The method of claim 1 wherein the LCR network is doubly terminated by a resistor connected to one end of the inductor chain and another resistor connected to another end of the inductor chain.

4. The method of claim 1 further comprising dynamically adjusting the plurality of multiplier factors to reduce an error measure based on the resulting signal.

5. The method of claim 4 wherein the plurality to multiplier factors are dynamically adjusted according to a least mean square (LMS) algorithm.

6. The method of claim 5 wherein the LMS algorithm utilizes the intermediate signals as gradient signals in dynamically adjusting the plurality multiplier factors.

7. The method of claim 1 wherein the ISI is associated with polarization mode dispersion (PMD), and the equalized signal has reduced effects relating to PMD.

8. The method of claim 1 wherein the plurality of linearly independent impulse responses are orthogonal impulse responses.

9. A apparatus for performing channel equalization comprising:

a plurality of filtering elements configured to respond to a signal received from a channel associated with inter-symbol interference, the plurality of filtering elements characterized by linearly independent impulse responses with respect to the received signal, the plurality of filtering elements capable of producing a plurality of intermediate signals in response to the received signal according to the linearly independent impulse responses, wherein the plurality of filtering elements comprises inductors and capacitors in an inductor, capacitor, resistance (LCR) network representing a Bessel filter having a bandwidth within an order of magnitude as a data transmission rate associated with the received signal, with the plurality of inductors connected in series to form an inductor chain and the plurality of capacitors each connected between a position along the inductor chain and a common position, and wherein the plurality intermediate signals comprise a plurality of inductor signals representing currents through a plurality of inductors and a plurality of capacitor signals representing voltages across a plurality of capacitors;

a plurality of scaling elements configured to scale each of the plurality of intermediate signals by each of a plurality of multiplier factors to produce a plurality of scaled signals; and a combining node configured to combine the plurality of scaled signals to produce a resulting signal corresponding to an equalized version of the received signal in order to reduce effects of inter-symbol interference.

10. The apparatus of claim 9 wherein the LCR network is singly terminated by a resistor connected to one end of the inductor chain.

11. The apparatus of claim 9 wherein the LCR network is doubly terminated by a resistor connected to one end of the inductor chain and another resistor connected to another end of the inductor chain.

12. The apparatus of claim 9 wherein the plurality of scaling elements are controllable to dynamically adjust the multiplier factors to reduce an error measure based on the resulting signal.

13. The apparatus of claim 12 wherein the plurality multiplier factors are dynamically adjustable according to a least mean square (LMS) algorithm.

14. The apparatus of claim 13 wherein the LMS algorithm utilizes the plurality of intermediate signals as gradient signals to dynamically adjust the plurality of multiplier factors.

15. The apparatus of claim 9 wherein the ISI is associated with polarization mode dispersion (PMD), and the equalized signal has reduced effects relating to PMD.

16. The apparatus of claim 9 wherein the plurality of linearly independent impulse responses are orthogonal impulse responses.

* * * * *

UNITED STATES PATENT AND TRADEMARK OFFICE
CERTIFICATE OF CORRECTION

PATENT NO. : 7,471,751 B2  
APPLICATION NO. : 10/872108  
DATED : December 30, 2008  
INVENTOR(S) : Shanthi Pavan

Page 1 of 1

It is certified that error appears in the above-identified patent and that said Letters Patent is hereby corrected as shown below:

Column 13, line 15, Claim 5      change "plurality to multiplier" to --plurality of multiplier--

Signed and Sealed this

Second Day of June, 2009

JOHN DOLL  
*Acting Director of the United States Patent and Trademark Office*